March 16, 1943.  R. R. COLBURN  2,314,031
APPARATUS FOR PNEUMATICALLY DISTRIBUTING
POWDERED AND GRANULAR MATERIAL
Filed Feb. 19, 1941   2 Sheets-Sheet 1

Inventor
Richard R. Colburn
By Williamson & Williamson
Attorneys

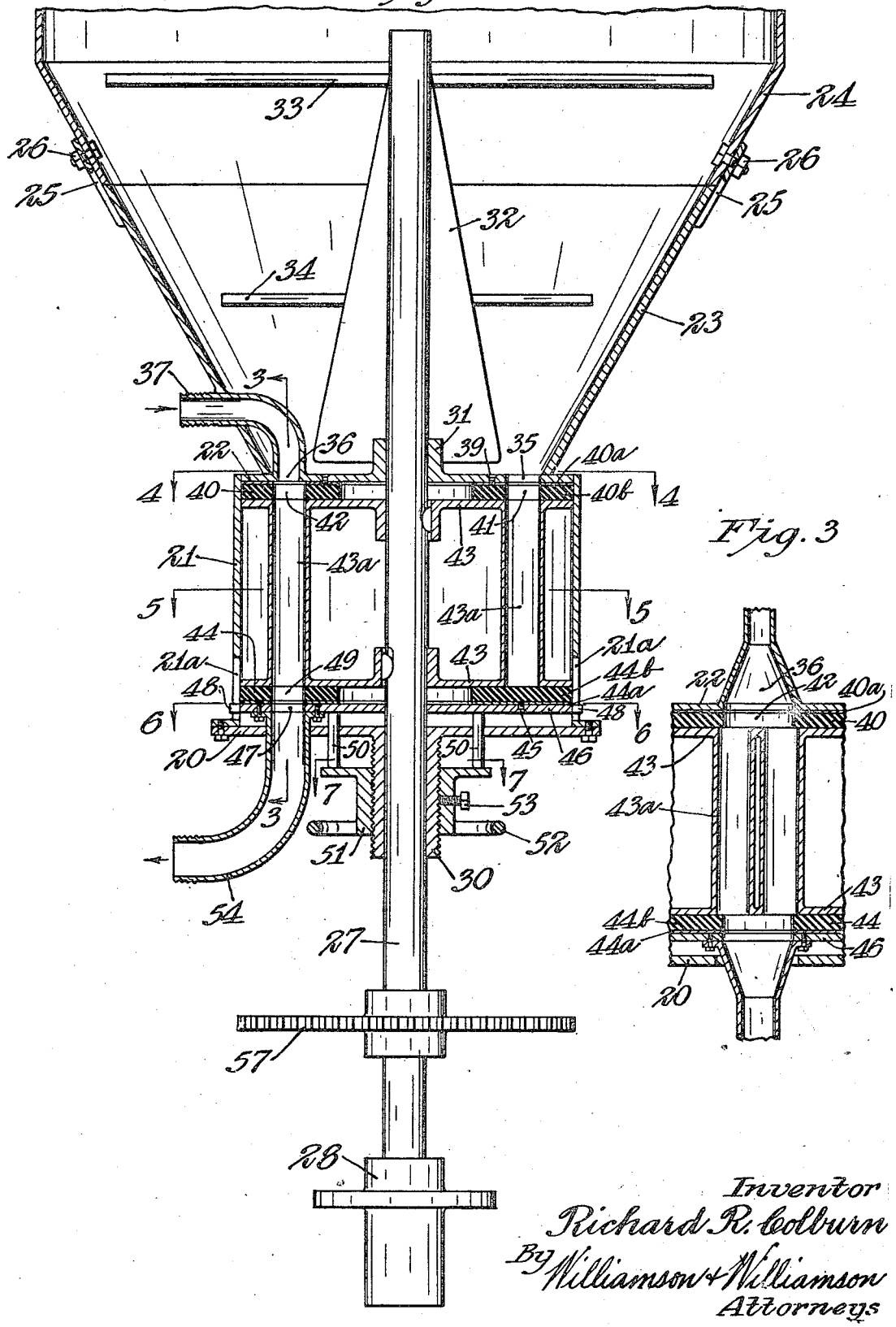

Patented Mar. 16, 1943

2,314,031

UNITED STATES PATENT OFFICE 2,314,031

APPARATUS FOR PNEUMATICALLY DISTRIBUTING POWDERED AND GRANULAR MATERIAL

Richard R. Colburn, Minneapolis, Minn.

Application February 19, 1941, Serial No. 379,720

2 Claims. (Cl. 302—49)

This invention relates to apparatus for conveying and distributing divided material. While this apparatus may be used for conveying and distributing any kind of granular or powdered material, it is intended primarily for use in conveying a dry mixture of cement and sand or gravel or both to a nozzle which adds water to the mixture to form concrete and sprays the concrete on the surface to which it is to be applied.

It is one of the objects of the invention to provide a novel and improved apparatus for pneumatically conveying and distributing divided material which can be continuously operated without shut down periods for loading a hopper from which the material is taken.

Another object is to provide in such apparatus novel means for handling the material to cause smooth continuous flow of the material to the conveying line.

Another object is to provide a simple and inexpensive novel apparatus for use in pneumatically conveying and distributing a dry concrete mixture through a conduit to a nozzle which is effective for use in building construction and elsewhere where concrete is to be employed.

The objects and advantages of the invention will more fully appear from the following description made in connection with the accompanying drawings wherein like reference characters refer to the same or similar parts throughout the various views and in which—

Fig. 2 is a vertical section on enlarged scale through the main part of the apparatus shown in Fig. 1;

Fig. 3 is a vertical section taken substantially on the line 3—3 of Fig. 2 as indicated by the arrows;

Figure 1:
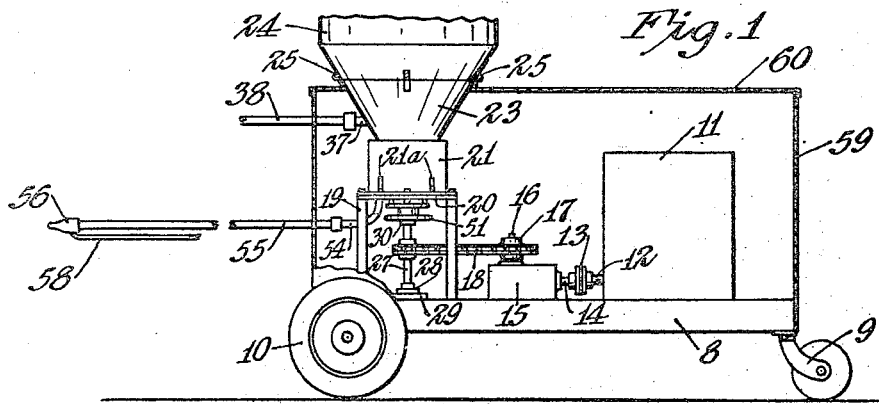
Fig. 1 is a view chiefly in side elevation but partly in vertical section illustrating an apparatus embodying the present invention.

Referring to the drawings, there is provided in accordance with the invention a supporting platform 8 mounted preferably on a front castor wheel 9 and on a wheel equipped rear axle 10 so as to be readily transportable from one point to another. Mounted on the platform 8 is preferably a gasoline engine 11 (no part of which is shown in detail) from which a drive shaft 12 runs to a flexible coupling 13 and a short shaft 14 runs from the coupling 13 into a speed reduction gear casing 15 (the details of which are not shown). A shaft 16 driven from the shaft 14 through the reducing gears in the gear casing 15 carries a sprocket 17 over which a sprocket chain 18 runs. The gear casing 15 is also preferably supported by the platform 8.

Supported on the platform 8 rearwardly of the gear casing 15 as by four legs 19 is a carrier housing consisting of a plate 20 and a cylindrical wall 21 secured thereto and projecting upwardly therefrom. To the top of the wall 21 a hopper bottom plate 22 is secured and a hopper 23 of truncated conical shape joins the plate 22 and is supported thereon. A removable hopper extension 24 in turn rests on top of the hopper 23 and is held in place thereon as by short arms 25 projecting upwardly from the top of the hopper 23 and welded or otherwise secured to the hopper and attached as by removable bolts 26 to the hopper extension.

A vertical shaft 27 is journaled at its lower end in a thrust bearing 28 received within an apertured plate 29 mounted on the platform 8. This shaft 27 projects upwardly through a bearing 30 carried by the plate 20 and projecting downwardly therefrom and the shaft above the plate 20 extends through the central part of the carrier housing and is journaled in a central bearing 31 secured to the hopper bottom plate 22 and projecting upwardly therefrom. The shaft 27 extends well into the hopper extension 24 and is provided above the hopper bottom plate 22 with a pair of triangularly shaped agitator fins 32 and also with upper and lower agitator arms 33 and 34 respectively.

Cement and sand or gravel or both are adapted to be placed within the hopper 23 and its extension 24 and of course the purpose of the fins 32 and the arms 33 and 34 is to mix the material together and work it down into the lower part of the hopper without allowing it to bank onto the sides of the hopper or the hopper extension.

Figure 4:
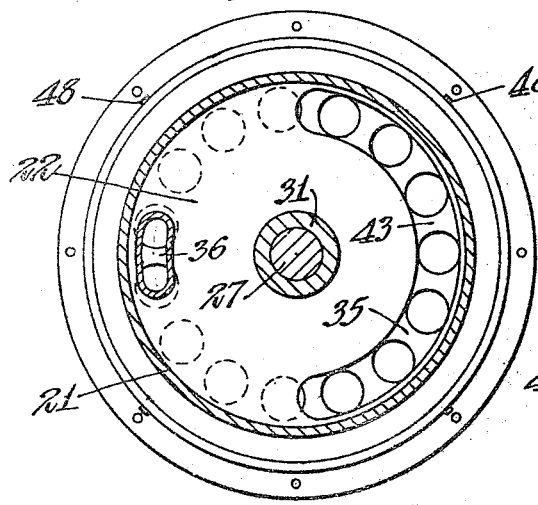
Fig. 4 is a horizontal section taken on the line 4—4 of Fig. 2 as indicated by the arrows.
Figure 5:
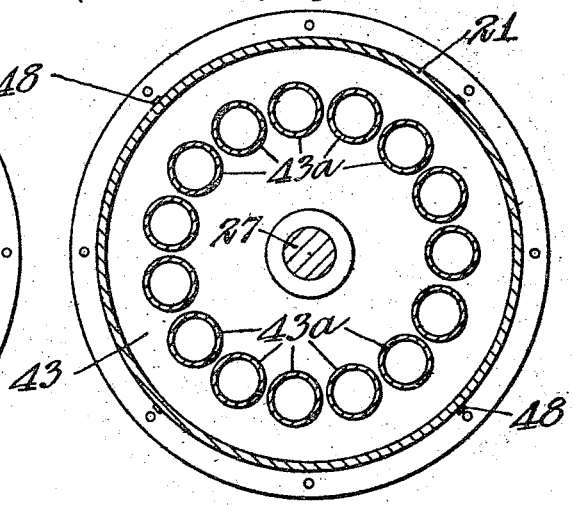
Fig. 5 is a horizontal section taken on the line 5—5 of Fig. 2 as indicated by the arrows.
Figure 6:
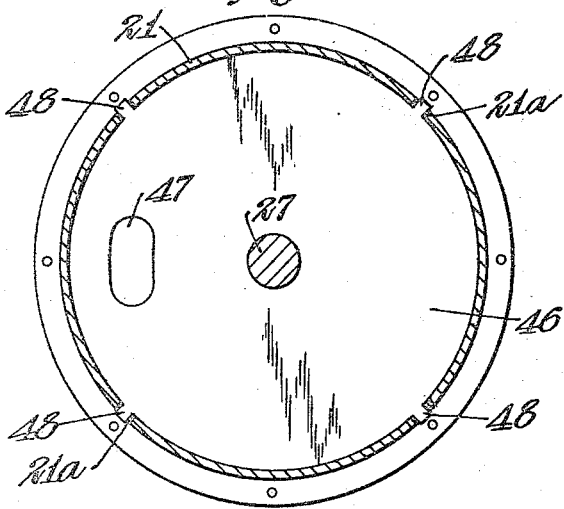
Fig. 6 is a horizontal section taken on the line 6—6 of Fig. 2 as indicated by the arrows.
Figure 7:
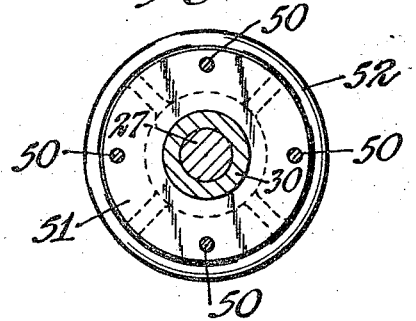
Fig. 7 is a horizontal section taken on the line 7—7 of Fig. 2 as indicated by the arrows.

As best shown in Figs. 2 and 4, the hopper bottom plate 22 is provided with an arcuate material delivering slot or opening 35 through which the material passes from the hopper 23. This material delivering slot is radially spaced from the axis of the shaft 27 and of course from the center of the hopper bottom plate 22, and the slot is preferably extended through an arc of approximately 180°. Radially spaced from the axis of rotation of the shaft 27 a distance corresponding to the radial spacing of the material delivering slot 35 is an air delivery port 36 which is provided in the plate 22. This port 36 is preferably of oval shape as shown and somewhat narrower than the material delivering slot 35. A pipe 37 running from outside the hopper 23 and mounted in the hopper is connected to the hopper bottom plate 22 to communicate with the air delivery port 36 and supply compressed air thereto. A hose 38 communicating with any suitable source of compressed air supply (not shown) is connected to the pipe 37 to deliver thereto.

Secured as by screws 39 to the lower side of the hopper bottom plate 22 is a sealing liner 40 which may be of ring shape as illustrated. This sealing liner includes a metal base 40a to which the screws 39 are secured and a rubber gasket 40b of heavy material suitable for long wear, the rubber gasket being preferably vulcanized to the base plate 40a. A slot 41 corresponding to the material delivering slot 35 is cut in the sealing liner 40 to directly underlie the slot 35 and an opening 42 is also cut in the sealing liner 40 below the air delivery port 36 but preferably the opening 42 is made somewhat wider than the air delivery port 36.

A rotary carrier 43 is secured to the shaft 27 below the upper sealing liner 40 and this carrier consists of upper and lower circular heads with a multiplicity of open ended tubes 43a extending between the heads. The tubes 43a are radially spaced from the axis of rotation of the shaft 27 to correspond to the radial spacing of the slots 35 and 41 therefrom and to also correspond to the radial spacing of the air delivery port 36 and the opening 42 therefrom. The tubes are located in closely spaced circumferential relation and it should be here noted that the length of the air delivery port 36 is considerably greater than the spacing between adjacent tubes 43a for a purpose presently to appear. Below the carrier 43 there is located a bottom sealing liner 44 which is formed of the same material as the upper sealing liner 40 and is secured as by screws 45 to a bottom plate 46, the sealing liner 44 consisting of a heavy rubber gasket 44b attached to a metal backing 44a as by vulcanizing. As shown the bottom sealing liner 40 is of ring shape. Below the air admission port 36 and in vertical alignment therewith the bottom plate 46 is provided with a discharge port 47 which is preferably of slightly greater width than the port 36 but of preferably the same length as the port 36. Discharge port 47 is, of course, radially spaced from the axis of rotation of the shaft 27 the same distance as the other ports and openings heretofore referred to. To prevent rotation of the bottom plate 46 while at the same time to permit of adjustment of the plate 46 longitudinally of the shaft 27, vertical slots 21a are cut in the carrier housing 21 which receive fingers 48 projecting from the edges of the bottom plate 46 at circumferentially spaced points. It should be stated that the lower sealing liner 44 is equipped with an opening 49 directly above the discharge port 47 which corresponds in size to the opening of the discharge port.

The bottom plate 46 carries a number of circumferentially spaced downwardly projecting pins 50 which extend through pin openings in the bottom plate 20 of the carrier housing. The bearing 30 formed on the bottom plate 20 of the carrier housing is provided with exterior screw threads and a nut 51 is screwed onto the said bearing 30 and is equipped with a flange at its upper end which bears against the lower ends of the pins 50. To readily manipulate the nut 51 the nut is provided with a steering wheel handle 52. To hold the nut in a set position a set screw 53 is provided. It will be seen that by running up the nut 51 the bottom plate 46 can be moved more closely to the hopper bottom plate 22 to take up for any wear that may occur in the upper and lower sealing liners 40 and 44 and to maintain the air seal between the upper liner 40 and the upper head of the carrier 43 and between the lower head of the carrier and the lower sealing liner 44 at all times, the carrier 43 being mounted for limited sliding movement on shaft 27 to permit of the adjustment.

Secured to the bottom plate 46 to communicate with the discharge port 47 is a pipe 54 which forms a gently curved elbow and communicates with a hose 55 running to a concrete spray nozzle 56. The shaft 27 carries a sprocket 57 over which the endless chain 18 travels.

In operation the gasoline engine 11 through the shaft 12, shaft 14, gearing in gear box 15, shaft 16, sprocket 17, chain 18, and sprocket 57 causes the shaft 27 to continuously rotate in a given direction as for example in a counterclockwise direction, thereby causing the carrier 43 to continuously rotate relative to the hopper bottom plate 22, the upper sealing liner 40, the bottom plate 46, and the lower sealing liner 44. In using the device for the gun spraying of concrete, Portland cement and sand and gravel, or Portland cement and sand, or Portland cement and gravel, in dry form are dumped into the hopper 23 and hopper extension 24. The material in the hopper feeds down through the material delivering slot 35 and the upper sealing liner slot 41 into the rotating tubes 43a of the carrier, filling the tubes immediately below these slots. As the carrier revolves the filled tubes are progressively brought to points underlying the air delivery port 36. Compressed air supplied from the source of supply through the hose 38 and pipe 37 works against the material in the tubes 43a as these tubes align with the air delivery port 36 and the compressed air successively forces the material in the tubes downwardly therethrough and through the opening 49 in the lower sealing liner 44 and through the discharge port 47 of the bottom plate 46 into the pipe 54 and thence through this pipe and through the hose 55 attached thereto to the nozzle 56. A water hose 58 is connected to the nozzle 56 and through a ring valve or other mechanism incorporated into the usual nozzle 56 water is supplied in the normal fashion to the material passing through the nozzle and the concrete in hydrated form is sprayed from the nozzle in the customary manner. Inasmuch as the air delivery port 36 and opening 42 in the upper sealing liner are of sufficient length to bridge between adjacent tubes 43a of the carrier the air delivery port 36 is constantly in communication with one or more tubes 43a of the carrier and as a result, assuming that the carrier is rotated at the proper speed, material is continuously discharged from the discharge port 47 of the bottom plate 46 and material continuously moves through the pipe 54 and hose 55 to the nozzle 56. In other words, instead of the material moving intermittently to the hose 55 and through the hose by series of pulsations, a continuous discharge of the material takes place which is highly important to the proper operation of the nozzle 56. The discharge from the nozzle therefrom is continuous rather than intermittent.

The apparatus also can be run continuously for an indefinite period of time without shut down inasmuch as it is unnecessary to stop the apparatus as material is supplied to the hopper.

By making the discharge port 47 and its companion opening 49 in the lower sealing liner 44 of such length relative to vertical alignment with the air delivery port 36 that the port 47 and its companion opening 49 do not extend beyond at least substantially vertical alignment with the air delivery port 36 in the direction of movement of the carrier 43, as best shown in Fig. 3, an important result is accomplished which is not at once apparent. If the discharge port 47 and its companion opening 49 did extend beyond the air delivery port 36 in the direction of movement of the carrier 43 a tube 43a after passing below the air delivery port 36 would be sealed at its upper end by the upper sealing liner 42 but would be in communication with port 47 at its lower end and compressed air and material after the tube was emptied would be carried back into the tube. Then at the time that the tube moved over to a position where the upper end of the tube or part of it was disposed below the material delivering slot 35, the compressed air in the chamber formed by the tube would be released to puff up or belch forth into the lower part of the hopper 23, forcing the material in the lower part of the hopper upwardly and creating dust in the hopper. By aligning the discharge port 47 and its companion opening 49 with the air delivery port 36 as a tube 43a moves from a position below the port 36 to a position at one side thereof both ends of the tube are sealed by the respective sealing liners 40 and 44 simultaneously and as a result the supply of compressed air to the tube 43a is completely cut off at one time. When the tube moves to a position underlying the material delivering slot 35 very little if any puff up of air released from the chamber formed by the tube occurs.

It is desirable to make the width of the air delivery port 36 somewhat less than the diameter of the interior of the tubes 43a to prevent the development of back pressure and to cause all air delivered through the port 36 to pass through the tubes.

In assembling the equipment on the support 8 it is desirable that a housing 59 having a removable cover 60 be employed to house the engine 11 and the driving mechanism below the upper edge of the hopper 23 so that as material is dumped into the hopper 23 and the hopper extension 24 it will not fall on the engine or drive mechanism.

While the apparatus has been described as it will be used in connection with the conveying of divided material to a nozzle for the spraying of concrete and the device is intended primarily for this use, it will be understood that the apparatus can be used for moving, distributing and conveying any type of powdered or granular material. It is contemplated for example that the apparatus may be employed for conveying grain, sand, gravel, etc. from one point to another.

It will, of course, be understood that various changes may be made in the form, details, arrangement and proportions of the various parts without departure from the scope of the present invention which generally stated consists in the matter shown and described and set forth in the appended claims.

What is claimed is:

1. In combination, an annular casing having an upright central axis and a series of slots extending parallel to said axis, a carrier rotatable within said casing and having an annular series of equally spaced upwardly and downwardly open measuring pockets revolvable about said axis, top and bottom plates coacting with said carrier to seal the adjacent pocket ends, one of said plates being fixed against movement and the other plate being movable along said axis and having peripheral lugs slidable along said casing slots to prevent rotation of said other plate about said axis, and said plates having local material supply and discharge openings respectively disposed out of vertical alinement with each other, means for urging said movable plate toward the fixed plate to snugly confine said carrier between the plates, a granular material supply hopper communicating with the supply opening in said top plate, a material delivery conduit communicating with the discharge opening in said bottom plate, and means for admitting compressed air to the successive pockets when passing over said discharge opening.

2. In combination, an annular casing having an upright central axis and a series of elongated vertical slots extending parallel to said axis, a carrier rotatable within said casing and having an annular series of equally spaced upwardly and downwardly open measuring pockets revolvable about said axis, top and bottom plates coacting with said carrier to seal the adjacent pocket ends, one of said plates being fixed against movement and the other plate being movable along said axis within said casing and having peripheral lugs slidable along said casing slots to prevent rotation of said other plate about said axis, and said plates having local material supply and discharge openings respectively disposed out of vertical alinement with each other, means coacting with said movable plate remote from said axis for urging said movable plate toward the fixed plate to snugly confine said carrier between the plates, a granular material supply hopper communicating with the supply opening in said top plate, a material delivery conduit communicating with the discharge opening in said bottom plate, and means for admitting compressed air to the successive pockets when passing over said discharge opening.

RICHARD R. COLBURN.